Dec. 31, 1929.  A. D'ORAZIO  1,741,507
DRILL
Filed Feb. 1, 1929
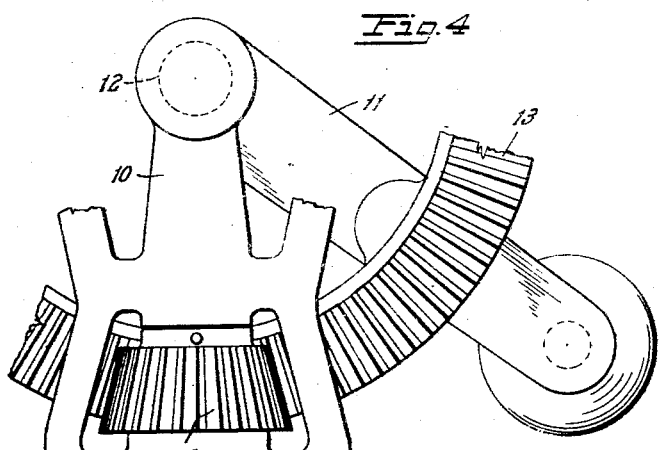
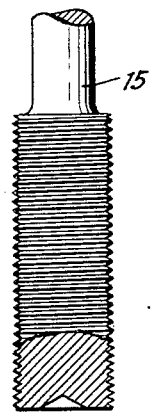
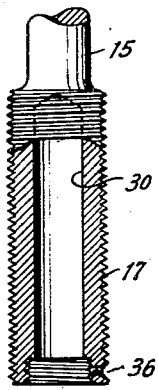
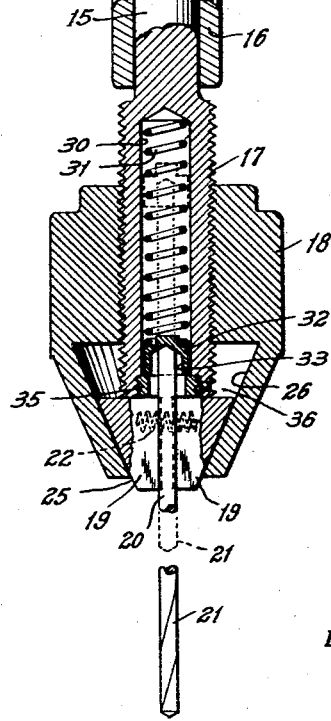
INVENTOR.
Alfred D'Orazio
BY
ATTORNEYS.

Patented Dec. 31, 1929

1,741,507

UNITED STATES PATENT OFFICE

ALFRED D'ORAZIO, OF YONKERS, NEW YORK

DRILL

Application filed February 1, 1929. Serial No. 336,747.

This invention relates to drills.

As is well known, it is very difficult to use a small gauge drill in a hand or breast drill manually or electrically operated, without bending or breaking the drill when pressure is applied thereto during the drilling operation.

One of the objects of the invention is to provide a drill so constructed and arranged that the drill shank can be inserted in the chuck to any desired extent.

Another object of the invention is to provide a drill holder so constructed and arranged that any desired length of drill shank or drill can be secured within the chuck, the projecting portion of the drill forming a depth gauge for determining the depth of the hole to be drilled.

Another object of the invention is to provide a drill holder having means for ejecting the drill when the drill is loosened from the chuck.

Further objects of the invention will appear from the following specification taken in connection with the drawings, which form a part of this application, and in which Fig. 1 is an elevational view, partly in section, showing the end of a drill shaft of ordinary construction;

Fig. 2 is a view similar to Fig. 1 but illustrating a drill shaft constructed in accordance with the invention;

Fig. 3 is a sectional elevation of a threaded collar adapted for insertion in the end of the shaft shown in Fig. 2; and Fig. 4 is an elevational view, partly in section, showing a hand drill having a shaft constructed in accordance with the invention.

The invention briefly described consists of a drill, such as a hand drill, having a rotatable shaft and a chuck mounted on the end of the shaft for securing or clamping the shank of a drill, the end of the shaft having a longitudinal recess or opening therein adapted to receive any desired portion of the drill shank. When the device is used with a drill of small gauge, the drill shank can be inserted through the chuck into the recess in the end of the shaft to a sufficient extent to leave protruding from the chuck only a sufficient length of drill to drill the required hole. In the particular form of the invention illustrated, a spring is mounted in the recess and a plunger is normally pressed by the spring to the outer end of the recess, the outward movement of the plunger being limited by a stopper. The drill shank is seated against the plunger or, if desired, in a socket formed in the plunger. Further details of the invention will appear from the following description.

In the particular embodiment of the invention shown in the drawings, there is illustrated a portion of a housing or casing 10 of a hand drill. The drill is actuated by a crank 11 which is secured to a shaft 12 having mounted thereon a bevel gear 13. The gear 13 meshes with a bevel gear 14 which is mounted on the upper end of a drill shaft 15, which in turn is rotatably mounted in a bearing 16.

The lower end of the shaft 15 is externally threaded, as shown at 17, and a chuck 18 is mounted on the threaded portion 17. Jaws 19 are mounted in the chuck 18 and are adapted to grip the shank 20 of a drill 21. As in the usual construction, a spring 22 normally presses the jaws away from each other and as the chuck 18 is threaded upwardly on the threaded portion 17 of the shaft 15, the jaws are forced inwardly by the engagement of the outer conical surfaces 25 on the jaws with the inner conical surface 26 on the chuck. The structure above described is common in hand drills.

In order to permit any desired amount of the shank to extend within the chuck, the outer end of the shaft is provided with a longitudinally extending recess 30. A spring 31 is mounted in the recess 30 and engages at its outer end a plunger 32 having a socket 33 for receiving the inner end of the drill shank 20. The outward movement of the plunger is limited by a collar 35 which is threaded into the outer end of the shaft and is secured against turning by a set screw 36.

When the drill is to be used, the shank 20 of the drill is inserted to any desired extent in the recess 30 by pressing the plunger 32 inwardly against the force of the spring 31. The chuck is then rotated and the jaws 19 will grip the shank 20 of the drill, leaving the desired length of drill extending outwardly beyond the chuck. If desired, the extending portion of the drill can determine the depth of the hole bored or, in other words, can act as a depth gauge. After the hole has been drilled, the chuck will be rotated to loosen the drill shank and the drill will be forced out of the chuck by the spring 31.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In a drill holder, a frame, a rotatable shaft held against axial movement therein, means adjacent one end of said shaft for driving the same, said shaft having a continuing portion extending from the frame at its other end, provided with a longitudinal recess extending thereinto from the outer end thereof, a chuck mounted on said portion of the shaft and adapted to secure a drill fixedly thereto, said recess communicating with the interior of the chuck, and adapted to receive the shank of a drill held by the chuck.

2. In a drill holder, a frame, a rotatable shaft, means adjacent one end of said shaft for driving the same, said shaft having a continuing portion extending from the frame, at its other end, provided with a longitudinal recess extending thereinto from the outer end thereof, a chuck mounted on said portion of the shaft and adapted to secure a drill fixedly thereto, said recess communicating with the interior of the chuck and adapted to receive the shank of a drill held by the chuck, a spring in said recess, a plunger freely movable in the recess and adapted to be engaged by the inner end of the drill shank normally pressed by the spring toward the outer end of the recess, and means for limiting the outward movement of the plunger.

3. In a drill holder, a frame, a rotatable member held against axial movement therein, means adjacent one end of said member for driving the same, said member having a continuing portion extending from the frame at its other end, provided with a longitudinal recess extending thereinto from the outer end thereof, a chuck mounted on said portion of the member and adapted to secure a drill fixedly thereto, said recess communicating with the interior of the chuck and adapted to receive the shank of a drill held by the chuck.

4. In a drill holder, a frame, a rotatable member, means adjacent one end of said member for driving the same, said member having a continuing portion projecting from the frame at its other end provided with a longitudinal recess extending thereinto from the outer end thereof, a chuck mounted on said portion and adapted to secure a drill to the member, said recess communicating with the interior of the chuck and adapted to receive the shank of a drill held by the chuck, and means in the recess to eject the drill when the drill is released by the chuck.

5. In a drill holder, a frame, a rotatable member, means adjacent one end of said member for driving the same, said member having a continuing portion projecting from the frame at its other end provided with a longitudinal recess extending thereinto from the outer end thereof, a chuck mounted on said portion and adapted to secure a drill to the member, said recess communicating with the interior of the chuck and adapted to receive the shank of a drill held by the chuck, means freely movable in said recess to eject the drill when the drill is released by the chuck, and means for retaining said freely movable means in the recess.

ALFRED D'ORAZIO.